United States Patent [19]

Sudo et al.

[11] 4,340,833

[45] Jul. 20, 1982

[54] MINIATURE MOTOR COIL

[75] Inventors: Michio Sudo, Kuki; Hitoshi Miura, Tatebayashi, both of Japan

[73] Assignee: Kangyo Denkikiki Kabushiki Kaisha, Tokyo, Japan

[21] Appl. No.: 207,484

[22] Filed: Nov. 17, 1980

[30] Foreign Application Priority Data

Nov. 26, 1979 [JP] Japan .................................. 54-153175

[51] Int. Cl.³ .............................................. H02K 1/12
[52] U.S. Cl. ..................................... 310/268; 310/207
[58] Field of Search ................ 310/268, 207, 266, 49A

[56] References Cited

U.S. PATENT DOCUMENTS

| | | | |
|---|---|---|---|
| 3,096,455 | 7/1963 | Hahn | 310/268 |
| 3,280,353 | 10/1961 | Haydon et al. | 310/268 |
| 3,324,323 | 6/1967 | Henry-Baudot | 310/266 |
| 3,719,845 | 3/1973 | Takeda | 310/268 |
| 3,737,697 | 6/1973 | Kitamori et al. | 310/207 |
| 4,125,792 | 11/1978 | Schmider | 310/268 |
| 4,271,370 | 6/1981 | Di Meo | 310/266 |

FOREIGN PATENT DOCUMENTS 55-26030 2/1980 Japan .................................. 310/268

Primary Examiner—J. D. Miller
Assistant Examiner—D. L. Rebsch
Attorney, Agent, or Firm—Pollock, Vande Sande & Priddy

[57] ABSTRACT

Spiral type first and second coils of the same shape and size are arranged opposite one another on both surfaces of an insulating sheet, the insulating sheet is made by piling and bonding two insulating films to each other using a bonding agent, the inner ends of the first and second coils which are opposite to each other are connected to each other via the insulating sheet, the outer ends are so connected that all coils are connected in series, and terminals are provided on both ends of the series connection.

17 Claims, 25 Drawing Figures

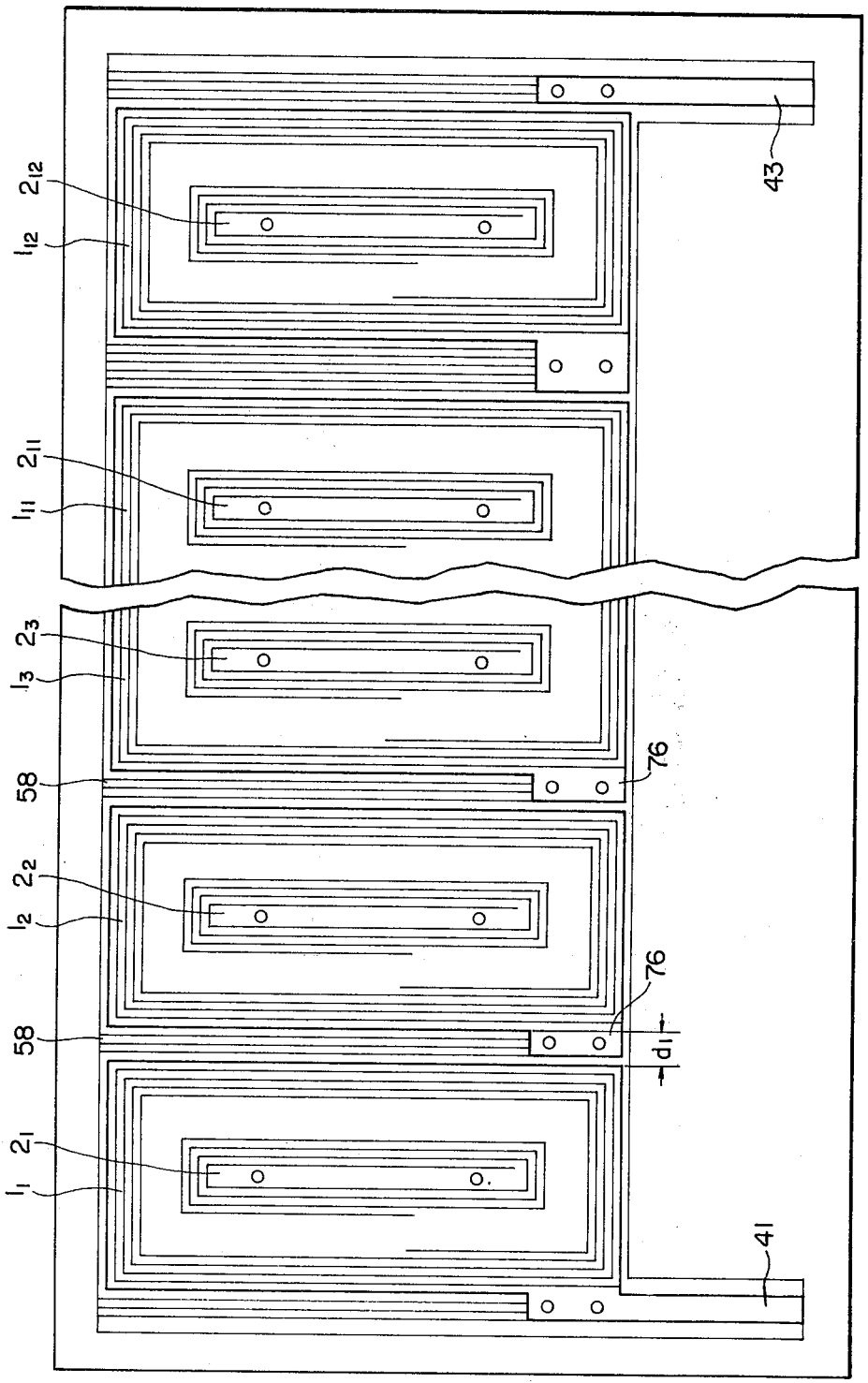

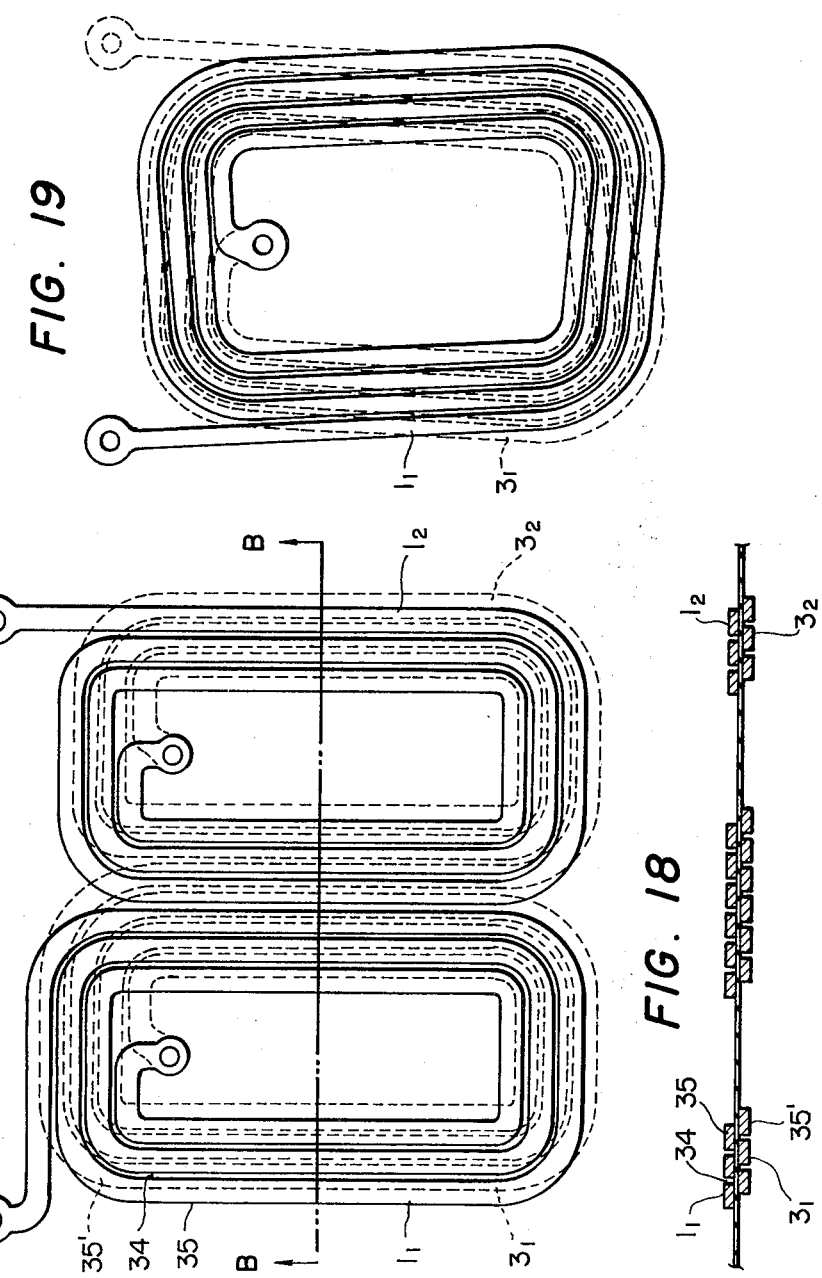

MINIATURE MOTOR COIL

BACKGROUND OF THE INVENTION

This invention relates to a miniature motor coil used, for example, as the drive coil of a brushless motor and the so-called transistor motor or as a power generating coil, the so-called FG coil.

The coils of these conventional kinds of motors were in the past made of so-called wound wire, or made by winding copper wire with a winding machine. With the miniaturization of the motor, it was desired to increase the current flowing through the coil and apply a strong magnetic field to the coil in order to improve the efficiency of the motor. In the conventional wire wound coil, the percentage of the space occupied by the coil conductor per unit space is reduced as the coil becomes smaller and accordingly the motor efficiency is lowered. For this reason, there was a limit in the miniaturization of the motor. It was difficult to obtain a small motor which possesses a considerable degree of output. Moreover, in conventional cases, it was necessary that the coil was wound by the wire winder and a plural number of coils thus wound were installed according to a predetermined layout, and the work to install a plural number of coils in a predetermined arrangement for very small motors, for example, for the motors whose motor cases are about 10 mm in diameter became very difficult. For this reason, there was a drawback of reducing the motor output due to the failure in keeping motor coils in correct arrangement.

An object of this invention is to offer a miniature motor coil capable of obtaining efficient miniature motors due to a large conductor occupation rate per unit space.

Another object of this invention is to offer a miniature motor coil which can be assembled into a motor with a high positional accuracy.

Still another object of this invention is to offer a miniature motor coil which has a high conductor occupation rate per unit space and is easy to manufacture.

Still another object of this invention is to offer a miniature motor coil which has a high conductor occupation rate per unit space and the conductor of which is uniform in thickness at each section.

Still another object of the invention is to offer a miniature motor coil which is formed on both surfaces of an insulating sheet and which enables connection between the two coils to be performed easily.

SUMMARY OF THE INVENTION

According to this invention, plural numbers of first coils and second coils of the same configuration and size are formed either in alignment or concentrically on both surfaces of an insulating sheet; these first coils and second coils are arranged in an opposing relation to each other with the insulating sheet therebetween and, when seen from one side of the insulating sheet, the winding directions of the spirals of the first coils and second coils are opposite to each other. What is important is that the insulating sheet is composed of two sheets of insulating films placed one above the other and bonded to each other by a bonding agent. This kind of configuration can be formed as follows. To the conductor foil used to form a group of the coils on one side, an insulating film is baked by the technique which is used, for example, to form enamel or formal coating on a wire. Accordingly a very thin insulating film can be formed. Two sheets of such conductor foil on which insulating films are formed respectively are used. The insulating film sides of these conductor foils are bonded to each other with a bonding agent. Then the conductor foils on both sides are used to form arrays of first coils and second coils respectively by employing the technique of so-called photoetching, which is often used in printed circuit technique and semiconductor technique. In this way the array of first coils and the array of second coils are formed on both sides of a very thin insulating sheet. Accordingly, the space occupation rate of the coil conductor can be significantly increased.

Each one of the first coils and the corresponding one of the second coils, which are on both sides of the insulating sheet and which are opposite to each other, are connected to each other at the center ends of the coils through the insulating sheet, and the outer ends of the first coil and the second coil are connected in such a way that all of the first coils and second coils are connected in series. Terminals are formed on both ends of the serially connected coils. In order to connect all of the first coils and second coils sequentially in series, either the connection between the outer end of each first coil and the outer end of a correspondingly adjacent one of the second coils through the insulating sheet is made in sequence, or the connection between the outer ends of adjacent first coils and the connection between the outer ends of adjacent second coils are made alternately in the direction of the arrays.

In the case where the coils of the present invention are used as drive coils and where the drive coils are arranged opposite to the end surfaces of permanent magnets mounted on the rotary shaft, the coils are arranged on the circumference of a circle, whose center is the rotary shaft, at constant angular intervals, and the number of coils formed is the same as the number of the poles of the permanent magnets on the rotary shaft. In this so-called axial flux type of two-phase motor, the coil sheet consisting of a plural number of coils formed in this way is used as 1st phase coils and another similar coil sheet which is angularly shifted from the 1st phase coils by half the coil pitch is used as 2nd phase coils. When it is required to increase the flux density, a plural number of coil sheets are used for both the 1st phase coil and 2nd phase coil and the ends of these coil sheets are connected to each other in such a way that in each of the 1st phase coils and the 2nd phase coils, the magnetic fluxes based on the current flowing through respective coils are added to each other. In each of the 1st phase coils and 2nd phase coils, the component coils are not of the conventional configuration wound by a wire winder one by one and arranged at predetermined angular positions, but instead are formed on the insulating sheet simultaneously by, for example, photoetching. Therefore, their mutual positional relationships are highly accurate. Moreover, in the case where a plural number of coil sheets are used, the coil sheets can be piled with high positional accuracy and their assembly can easily be made by preparing position aligning means on the coil sheets beforehand.

In the case where this invention is to be applied to the so-called radial flux type motor where drive coils are arranged around permanent magnets concentrically with respect to the shaft of the motor, both the first coils and second coils are prepared on a straight line to form a coil sheet and the number of either the 1st and the 2nd coils on the coil sheet are made the same as, or an integral number of times of, the number of poles of the permanent magnets of the motor and, in the case of the latter, the coil sheet is folded cylindrically in the direction of the coil array and coils of each winding layer are placed to be opposite to each other. In any case, the angular interval between adjacent coils is made equal to the angular interval between adjacent poles of the rotor magnet. In this way, when this invention is applied to the radial flux type motor, the manufacture of the coils and their mounting in the motor can be made very simple with high positional accuracy.

The opposing relation between the first coils and second coils formed on both sides of the insulating sheet can be slightly displaced so that each coil conductor on one side overlaps, via the insulating sheet, the opposite and adjacent conductors on the other side along over half a length, whereby the coil sheet is made mechanically strong and easy to handle. In other words, since the insulating sheet is very thin, the places on both sides of insulating sheet where the coil conductors are absent, become easy to break and hard to handle. Therefore, care is taken not to let such places be present, or, if present, to assure that they are very short in length. Moreover, as was mentioned before, those coils can be formed by photoetching, in which case one to several strings of dummy lines having the same width and pitch as the width and pitch of the coil conductors are provided approximately on the outer circumference of the coils. In this way the thickness of the coil conductor can be made uniform when coils are made by etching. Connections between 1st coils and 2nd coils are made at many places passing through the insulating sheet. In this case the conductor pattern at the connecting section on one side has a negative-positive relationship to the pattern on the opposite side and these patterns at the connecting section are connected to each other on the same plane so that they cover the empty spaces in one another. Connection of coils can be made very simply by this configuration.

BRIEF DESCRIPTION OF THE DRAWINGS

FIG. 14 is an unfolded view showing an example of the coil of the present invention applied to the drive coil of a radial flux type motor.

FIG. 17 is a top view showing an example where the coils on both sides of the insulating sheet are displaced from each other.

FIG. 18 is a sectional view taken on line B-B of FIG. 17.

FIG. 19 is a top view showing another example in which the coils on both sides of the insulating sheets are displaced.

DETAILED DESCRIPTION OF PREFERRED EXAMPLE

Figure 1:
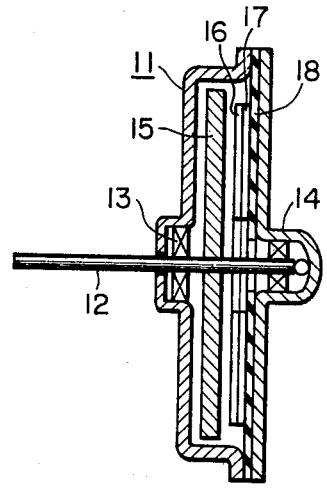
FIG. 1 is a sectional view showing a prior art axial flux type motor.

Before explaining this invention, an example of general configuration of the motor to which the miniature motor coil of the present invention can be applied will be explained. FIG. 1 shows an axial flux type motor in which a motor case 11 is formed with a flat magnetic body, a rotary shaft 12 is inserted through the motor case 11, and the rotary shaft is held in the motor case 11 rotatably through bearings 13 and 14. In the motor case 11, a rotor 15 comprising a plane permanent magnet is mounted to the rotary shaft 12, and on the end surfaces of rotor 15 there are formed, at equal angular intervals around the rotary shaft 12, magnetic poles generating magnetic flux parallel to the rotary shaft. Opposite to the end surfaces of the rotor 15, are installed 1st phase drive coils 16 and 2nd phase drive coils 17, respectively.

Figure 2:
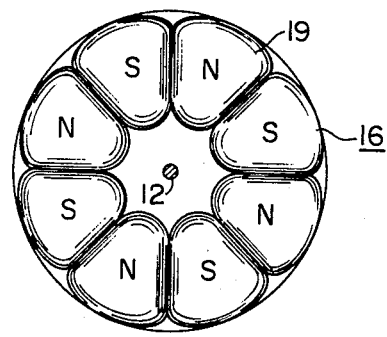
FIG. 2 is a drawing showing the relationship between the coils and magnetic poles of the motor shown in FIG. 1.

The drive coils 16 and 17 are mounted on a wiring board 18 on which wiring for these drive coils and an angular position detecting element are installed. The 1st phase drive coil 16 is, for example, formed by a plural number of coils 19 which are arranged at equal angular intervals on a circumference around the rotary shaft 12 as shown in FIG. 2. In this example, eight coil elements 19 are used which are the same in size, and the relationship between these coils 19 and the permanent magnet 15 is, as shown in the drawing, such that the number of the poles and the number of coils are selected to be equal so that at a certain rotated angle of the rotor the centers of the coils 19 are opposite to the respective N and S poles. The second phase coil 17 is disposed in an angularly displaced relation with the first phase coil 16 by half the pitch of the coils 19. This axial flux type motor is formed in such a way that the fluxes parallel to the rotary shaft which are generated from the rotor 15 pass through the 1st phase coils and 2nd phase coils. Since the rotation of the motor by the electric energization of these 1st phase and 2nd phase coils, in other words the rotary operation of the rotor 15, is well known, its description will be omitted.

Figure 3:
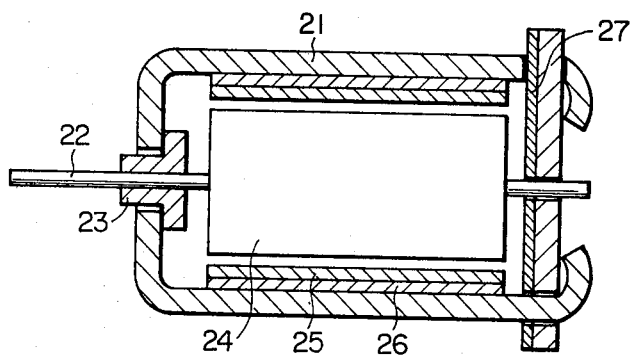
FIG. 3 is a sectional view showing a radial flux type motor.
Figure 4:
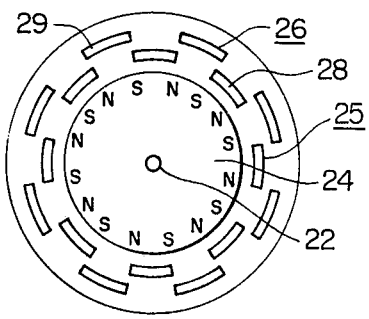
FIG. 4 is a drawing showing the relationship between the coils and magnetic poles of the motor shown in FIG. 3.

On the other hand, in the radial flux type motor shown in FIG. 3, a rotary shaft 22 is inserted through the shaft core position of a cylindrical motor case 21 and is held by a bearing 23. In the motor case 21, a permanent magnet rotor 24 is mounted on the shaft 22 and 1st phase coils 25 and 2nd phase coils 26 are installed on the inner surface of the motor case 21 opposite to the outer surface of the rotor 24. A base board 27 for the wiring of the power supply to these coils and for the mounting of the detecting element for detecting the revolutionary angular position of the rotor 24 is installed on the inner surface of one end surface of the case 21. For example, in the case where the number of poles is 16 and the motor is of the 2-phase type, a total of 16 N poles and S poles are provided on the outer surface of the rotor 24 as shown in FIG. 4. At constant angular intervals twice that of the magnetic poles, eight coils 28 of the 1st phase coil 25 are provided and similarly eight coils 29 of the 2nd phase coil 26 are also installed at the same angular intervals. Each 1st phase coil is angularly shifted from an adjacent 2nd phase coil by a half coil pitch.

In both conventional motors of the axial flux type and radial flux type, the motor coils are normally formed by winding conductor around winding frames, removing the resulting coils from the winding frames, and then installing them in the motor case so that they are in a predetermined arrangement relation to one another. For this reason the efficiency of the motor is decreased with miniaturization of the motor since the space occupied by the coil conductor relative to external size of the coil becomes small. Moreover, with miniaturization of the motor, the assembly work by which the coils made one by one are arranged correctly in the relationships shown in FIG. 2 and FIG. 4 becomes very difficult. For this reason there was a limit in the extent to which the motor could be miniaturized and the miniaturization was very expensive.

Figure 5:
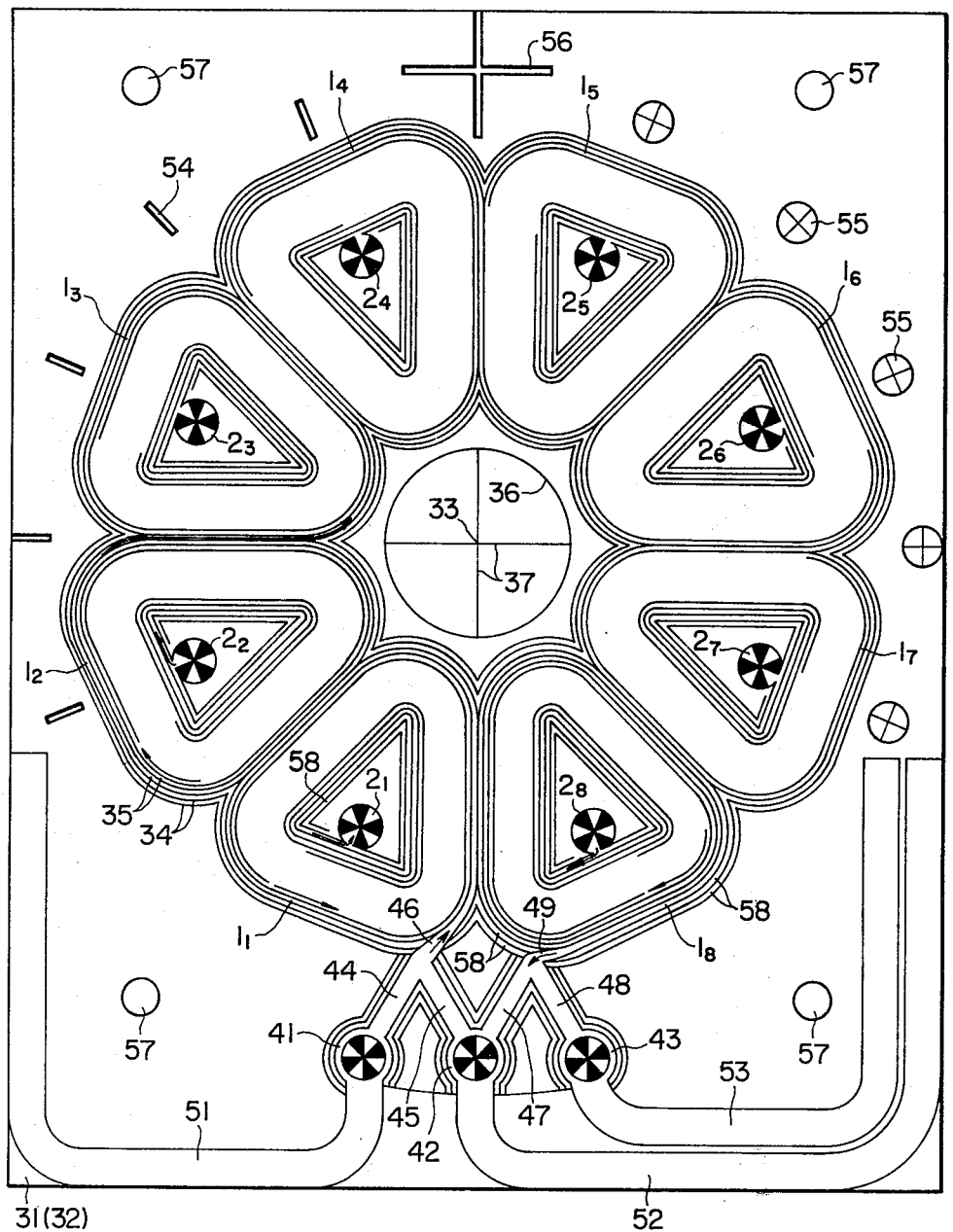
FIG. 5 is a top view showing an example in which the miniature motor coils of the present invention are adopted as the drive coils of an axial flux type motor.
Figure 6:
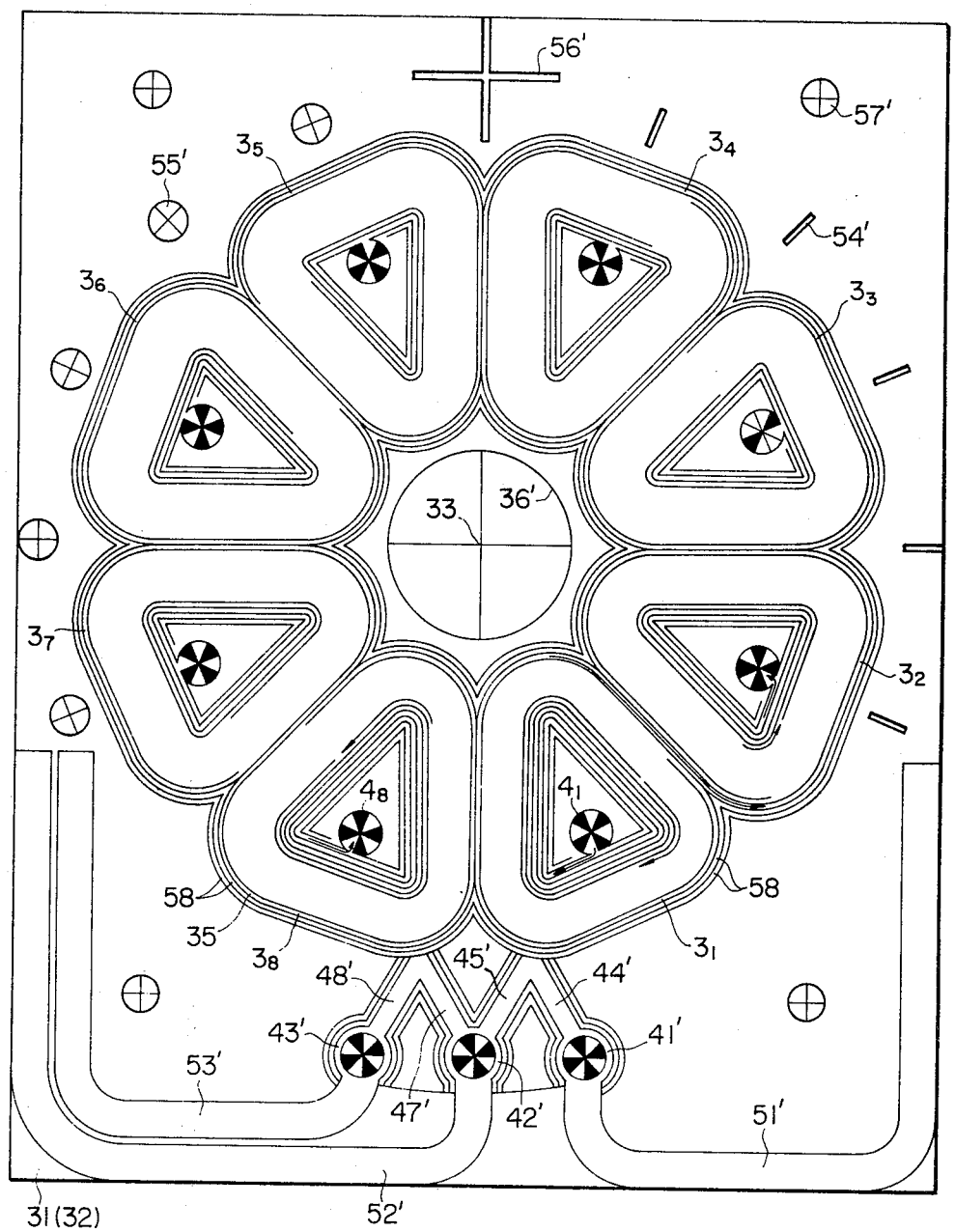
FIG. 6 is a bottom view of FIG. 5.

FIG. 5 and FIG. 6 show an example wherein the miniature motor coil of the present invention is applied to the drive coil of an axial flux type motor. FIG. 5 shows one side of the coil structure, for example the front view and FIG. 6 shows its back side. In this example, a conductor layer, for example, copper foil 32, is formed on an insulating sheet 31 (e.g., as will be described subsequently in reference to FIG. 9), and this copper foil 32 is photo-etched to form coils $1_1$ through $1_8$ arranged, adjacent to each other, on the same circumference. Each coil is formed as a triangular-like spiral coil wound in the clockwise direction. In each coil shown in the drawing, the solid line represents a groove 34 separating the coil conductors. Accordingly the interval between the adjacent grooves 34 is the coil winding or the coil conductor 35.

On the inside of the arrangement of the coil $1_1$ through coil $1_8$, a circular groove 36 having the center 33 as its center is formed, and a cross groove 37 is also formed inside the circular groove 36. When the inside of the circular groove 36 is punched out to form a hole and assembled into the motor, the rotary shaft of the motor is inserted through this hole. In this example, terminals 41, 42, 43 are provided on the outside of the coils $1_1$ through $1_8$. The terminals 41 and 42 are connected to an outer end 46 of the coil $1_1$ by way of switching connecting sections 44 and 45, and the terminals 42 and 43 are connected to an outer end 49 of the coil $1_8$ by way of the switching connecting sections 47 and 48. Lead wires 51, 52 and 53 which are connected to the terminals 41, 42 and 43 respectively are formed in ribbon form along the edge of the insulating sheet 31 respectively. The inner ends of the coils $1_1$ through $1_8$ are connected respectively to connecting sections $2_1$ through $2_8$. Further, on the outside of the arrays of the coils $1_1$ to $1_8$, a plurality of positioning patterns 54 and 55 are formed respectively at predetermined angular positions. The pattern 54 is in the shape of a thin slot, is made by removing copper foil, and accordingly is transparent and can be easily recognized from outside. On the one hand, the pattern 55 is a cross groove formed within a circular groove, and is used to perform accurate position alignment. Further near the edge of the sheet exterior to and midway between the coils $1_4$ and $1_5$ there is formed a considerably large cross-shaped position alignment pattern 56. At positions considerably close to the four corners of the insulating sheet 31, patterns 57 are formed which can be punched out, when required, to insert therethrough jigs.

On the back side of the insulating sheet 31, copper foil 32' is formed almost in a similar manner to the front side as shown in FIG. 6, and further coils $3_1$ through $3_8$ are formed at positions opposite the coils $1_1$ through $1_8$ via the insulating sheet 31. When viewed from the back side, the coils $3_1$ through $3_8$ are formed, similarly to the coils on the front side, into triangular-shaped spirals wound in clockwise direction, and accordingly these coils $1_1$ through $1_8$ and coils $3_1$ through $3_8$ are wound in reverse directions when seen from the same side. The center of the array of the coils $3_1$ through $3_8$ is made to coincide with the point 33. Opposite respectively to the front side terminals 41 through 43, terminals 41' through 43' are formed on the back side. Moreover, change-over connecting sections 44', 45', 47', and 48', which are opposite to the changeover connecting sections 44, 45, 47, 48 respectively, are formed to be connected to the terminals 41' through 43', and further, opposite to the front side lead wires 51 through 53 respectively, lead wires 51' through 53' are formed and connected respectively to the terminals 41' through 43'. Similarly, opposite to the positioning patterns 54 through 57, positioning patterns 54' through 57' are formed respectively. Opposite to the circular groove 36 for opening hole, a circular groove 36' is formed. With respect to the inner end of each of the coils $3_1$ through $3_8$, their connecting sections $4_1$ through $4_8$ are formed opposite to the front side connecting sections $2_1$ through $2_8$.

Further with respect to each of the front side and back side, dummy lines 58 are formed almost surrounding each coil and with about the same pitch as the pitch of the coil conductor 35. In this example, since each coil is closely adjacent to the next one via the thin groove 34, the dummy wires 58 are formed only in the outer circumference section and inner circumference section of the coil array and, in this example, the dummy wires 58 are formed with two strings. While on the inner side of each coil, one string is used as the dummy wire 58. As can be seen from the pattern of FIG. 5, for example, there are some areas of conductor array where the conductors are closely lying side by side. When forming the pattern by etching, the etching condition near the boundary of the conductor array tends to be different from that around the middle of the conductor array depending on the type of adjacent area. As a result, the conductors in the neighborhood of the boundary are sometimes thick and other times thin. However, by providing dummy wire 58, it is possible to make the thickness of the coil connectors of each coil almost the same.

Figure 7A:
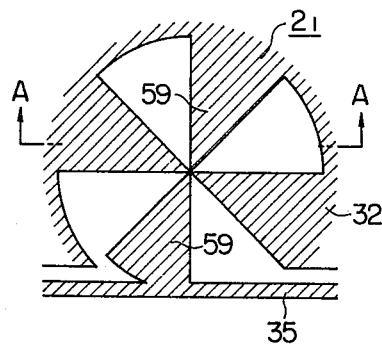
FIG. 7a is a drawing showing a pattern of connecting section $2_1$.
Figure 7B:
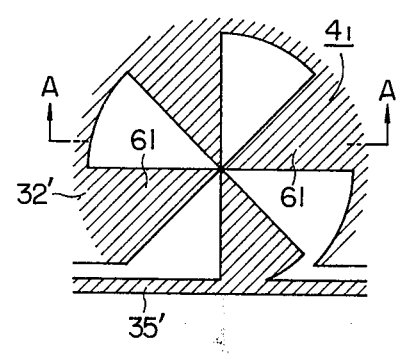
FIG. 7b is a drawing showing a pattern of connecting section $4_1$.
Figure 8A:
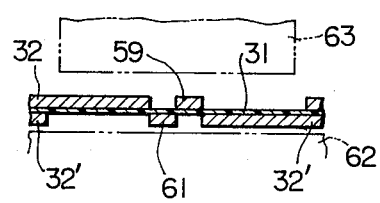
FIG. 8A and FIG. 8B are drawings showing the connecting process at connecting sections.
Figure 8B:
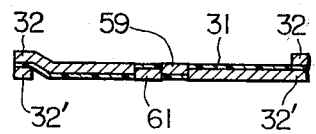

The coils $1_1$ through $1_8$ and $3_1$ through $3_8$ formed on both surfaces of the insulating sheet are all connected in series. For this purpose, the connecting sections $2_1$ through $2_8$ and $4_1$ through $4_8$ at the inner end of each coil are connected to each other through the insulating sheet 31. This connection is made, for example, as follows. The two connecting sections to be connected to each other are formed by mutually compensating patterns, in other words, a positive pattern and a negative pattern in which one pattern fills the empty part of the other pattern. For example, as shown in FIG. 7A, in the connecting section $2_1$ are formed a conductor pattern 59 consisting of four fan-shaped conductors which are formed by dividing angularly a disk into eight equal regions and removing four regions alternately. In the connecting section $4_1$ which is on the back side and which is opposite to the connecting section $2_1$, four similar fan-shaped conductor regions 61 are provided so that they are positioned between the conductor regions 59 as shown in FIG. 7b when seen from the same surface side. One part of the conductor region 59 of the connecting section $2_1$ is connected to the coil conductor 35 which forms the coil $1_1$ and, similarly, one part of the conductor region 61 of the connecting section $4_1$ is connected to the conductor 35' which forms the coil $3_1$. Accordingly these connecting sections $2_1$ and $4_1$ are so arranged, as shown in FIG. 8A taken on the A—A section lines of FIGS. 7a and 7b, that the conductor regions 59 and 61 are not opposite to each other via the insulating sheet, but that these conductor regions fill the empty regions. As shown in FIG. 8A, the insulating sheet 31, on which the copper foils 32 and 32' are formed, is placed on a base board 62 and the connecting section $2_1$ is pressed against the base board 62 by a pressure pin 63 which has an end surface almost the same size as the connecting section $2_1$, to bring about the situation shown in FIG. 8B. In other words, the conductor regions 59 and 61 of the connecting sections $2_1$ and $4_1$ are filling each other and positioned almost on the same surface, and under these conditions these conductor regions are connected. The connection is made by, for example, applying a voltage across the base board 62 and the pressure pin 63 and connecting the conductor regions 59 and 61 electrically to each other by way of arc welding. The conductor regions 59 and 61 can be also connected by soldering, etc. In this way, the connecting sections $2_1$ and $4_1$ can be connected electrically in a simple manner. Similarly the, other connecting sections $2_2$ through $2_8$ can be connected electrically to the connecting sections $4_2$ through $4_8$, respectively.

The outer ends of the coils are connected as follows in order to connect all coils in series. In this example, the coils $3_1$ and $3_2$ are connected at the section where their outer ends are adjacent to each other and similarly coils $1_2$ and $1_3$ are connected at the adjacent parts of the outer ends. In this way on both sides, pairs of adjacent coils are connected and the connecting positions are shifted by one coil between the front side and the back side. As a result, the current supplied from, for example, the terminal 41 of the front side is supplied to the coil $1_1$ from the outer end 46 and flows along this coil conductor, reaches the inner end connecting section $2_1$, and then passes through the connecting to section $4_1$ on the back side, flows through the coil $3_1$ toward the outside and, from the outer end of the coil $3_1$, flows toward the inner side of the coil $3_2$, goes to the front side from the inner end $4_1$, flows through the coil $1_2$ from inside to outside, then through the coil $3_1$ from outside to the inside, reaches its inner end $2_3$, then passes the inner end of the coil $3_3$, runs from the inside of the coil $3_3$ toward the outer side and then, in a similar way, runs through the coil on the front side and the opposite coil on the back side and then through the adjacent coil on the same side. In this way the current flows through each coil in sequence and finally flows through the coil $1_8$ from the inner side toward the outer side and when the current reaches the outer end 49 of the coil $1_9$ it will flow to the terminal 42 or 43. Accordingly, when the coil of the present invention is used, one of the change-over connecting sections 44 and 45, for example, 45 is cut off and 48 of the change-over connecting sections 47 and 48 is cut off, and conversely, when the connecting section 44 is cut off the connecting section 47 is also cut off. Further the terminals 41 through 43 and the terminals 41' through 43' on the back side are connected each other via the insulating sheet 31 in a way similar to the connecting sections $2_1$ through $2_8$ and the connecting sections $4_1$ through $4_8$, and thus the electrical connections between the lead wires 51 through 53 and 51' through 53' are respectively made. Therefore, the connection between the lead wires 51 through 53 and the outside can be established without considering the front side or back side. The change-over connecting sections 44', 45', 47', and 48' are not connected to the coils $3_1$ and $3_8$. In this way the coils $1_1$ through $1_8$ and $3_1$ through $3_8$ are connected in series and the magnetic flux generated by the current flowing through mutually opposite coils is added to each other.

Figure 9A:
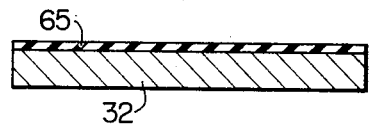
FIG. 9A to FIG. 9C are drawings showing the process of forming conductor layers on both surfaces of an insulating sheet.

The process of forming the coil sheet, which is the insulating sheet 31 having a plurality of coils formed on both sides thereof as shown in FIGS. 5 and 6, is as follows. As shown in FIG. 9A, an insulating film 65 is formed on the conductor layer, for example, the copper foil 32. The copper foil used can be, for example, 10 $\mu$m to 1 mm in thickness. In this example a copper foil of 80 $\mu$m in thickness is used. As the insulating film 65, use is made of such baking paints as polyurethane resins, epoxy resins, or phenol resins, which are highly heat resistant and excellent in electric insulating property and which can be coated to the copper foil 32. The insulating film 65 is formed to have a thickness from 1 $\mu$m to 30 $\mu$m, favorably a thickness of about 3 $\mu$m to 5 $\mu$m, and care is taken not to form pin holes. The formation of such an insulating film 65 can be made, for example, in a manner similar to that used in coating an insulating film for enameled wire and Formal wire. The insulating paint for these enameled wire and Formal wire applications is about 2 $\mu$m to 3 $\mu$m in thickness and is very excellent in that it has no pin holes at all. Like the insulating coating for a wire conductor, the coating of insulating film 65 is attained by soaking a piece of felt in the baking paint, applying it to the conductor layer 32, and then passing the conductor layer 32 through a furnace of 150° C. taking 2 to 3 seconds to dry. The thickness of the insulating film 65 can be made to a desired value by repeating the procedure of drying after coating one time and then coating and controlling the number of coating times.

Figure 9B:
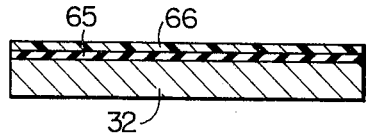
Figure 9C:
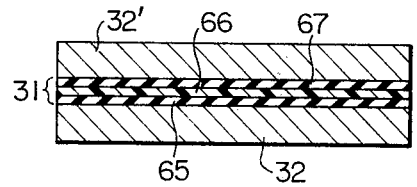

Two sheets of such conductor layers 32 and 32' on which insulating films 65 have been formed are put together on their insulating film side and bonded as shown in FIG. 9B. the bonding agent 66 used is preferably a heat resistive bonding agent such as polyester resin bonding agent or epoxy resin bonding agent. Such a bonding agent is diluted with a solvent like thinner and then, in a manner similar to the coating of the insulating film mentioned above, soaked into felt, coated on the insulating film 65, whereafter the solvent is evaporated by natural drying or drying in a vacuum room. Alternatively, the bonding agent 66 can be dried by heating at a temperature which does not harden the bonding agent 66. Further, as shown in FIG. 9C the copper foil 32' on whose bottom surface the insulating film 67 has been formed in a similar way, is placed on the bonding agent 66, with the insulating film side 67 being on the bonding agent 66 side, and by passing the pile of the two sheets through the gap of a pair of rollers, these two can be bonded strongly. The bonding agent 66 is hardened by natural drying or heating depending on the kind of the bonding agent. In this way, the insulating sheet 31 is formed with the insulating films 65, 67 and bonding agent 66. Thus, on both surfaces of the insulating sheet 31 are formed the copper foils 32 and 32'.

The desired pattern is formed by conducting so-called photoetching on these copper foils 32 and 32'. That is, although not shown particularly in the drawing, a photosensitive resin layer is formed on each of the copper foils 32, 32' and the desired pattern is exposed on the photosensitive resin layers, developed, immersed in etching solution, or exposed to the blowing of atomized etching solution, to form coil patterns like the ones shown in FIG. 5 and FIG. 6 on the copper foils 32 and 32'. Such an insulating sheet is very thin —about several to several tens μm in thickness, and a coil sheet, which is the insulating sheet 31 having desired coils on both surfaces, can be obtained. After forming the desired patterns of coils by etching the copper foils 32 and 32', when required, the thickness of the coils is increased by electroplating copper onto the coils and, at the same time, the width of the groove 34 between the coil conductors is made narrow. According to the procedure described above, it is easy to realize a width of the coil conductor 35 of 0.485 mm and a width of the groove 34 of 0.03 mm, for example.

Figure 10:
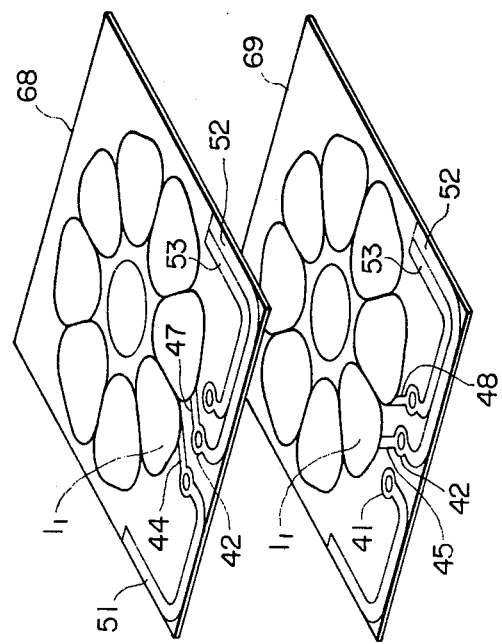
FIG. 10 is a drawing explaining the piling of the coil sheets shown in FIG. 5.

The coil sheet shown in FIG. 5 and FIG. 6 is used as either the 1st phase coil 16 or 2nd phase coil 17 of the axial flux type motor shown in FIG. 1. In this case, as was described previously, the area inside the circular groove 36 is punched out to make a hole so that the motor shaft 12 can be inserted. When required, the marginal area of the conductor sheet is punched or cut off and the insulating sheet portions under the lead wires are removed so that the lead wires 51, 52 and 53 are taken out as the ribbon type lead wires and connected to the wiring base board 17. A plural number of such coil sheets are used in a pile to increase the torque of the motor. For example, two coil sheets 68 and 69 shown in FIG. 5 and FIG. 6 are used in a pile as shown in FIG. 10. When piling the sheets, an insulating film is placed between the coil sheets or an insulating coating is applied to the coil sheets before piling.

Further, in this case, the change-over connecting sections 45 and 48 of the coil sheet 68 are cut off as shown in FIG. 10, leaving the change-over connecting sections 44 and 47 as they are, and on the coil sheet 69 the change-over connecting sections 44 and 47 are cut off, leaving the change-over connecting sections 45 and 48. The terminals 42 of the coil sheets 68 and 69 are connected to each other, in other words, the center lead wires 52 of the coil sheets 68 and 69 are connected to each other. When a voltage is applied between the lead wire 51 of the coil sheet 68 and the lead wire 53 of the coil sheet 69, the current flows through the coils on both sheets 68 and 69 in series and all the magnetic fluxes generated by mutually opposing coils are added together. In other words, as shown in FIG. 7, the change-over connecting sections 44, 45, 47, and 48 are provided, some of the change-over connecting sections are cut off, and the central terminals 42 or lead wires 52 are connected to each other, thereby to facilitate the piling of two coil sheets and power supply to both coils in series.

Figure 11:
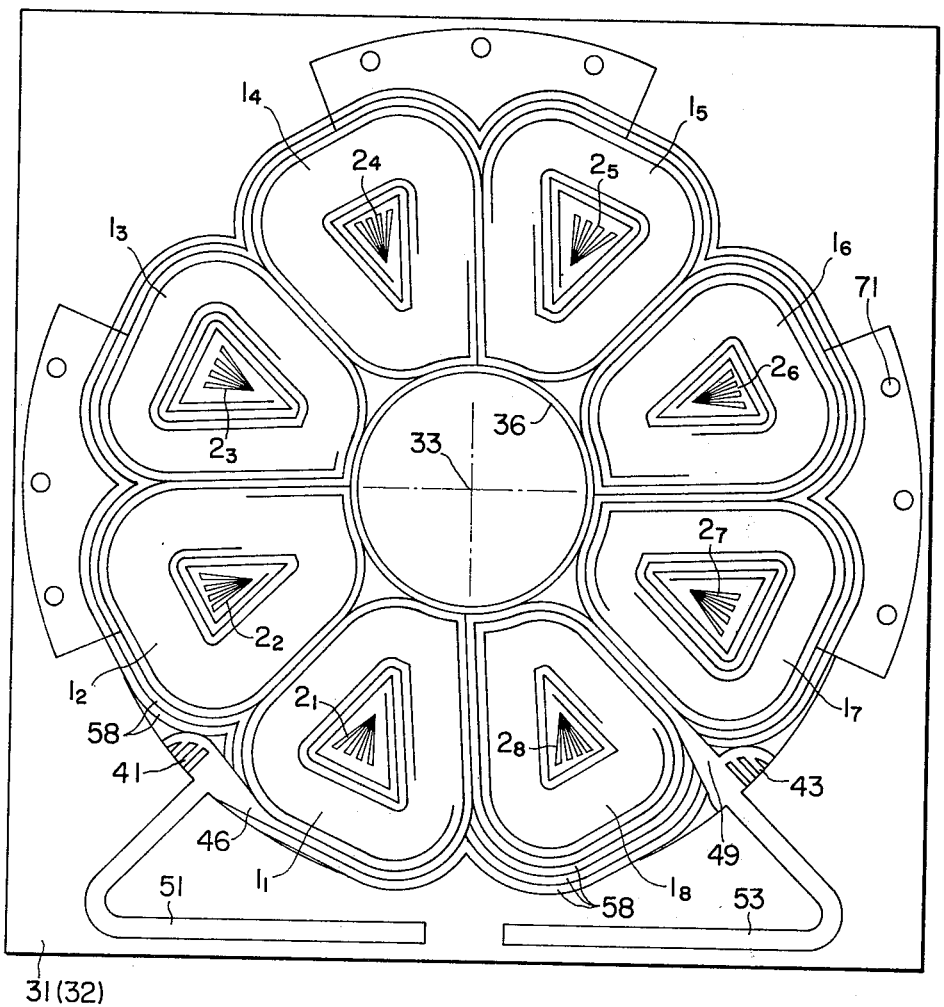
FIG. 11 is a top view showing another example in which the miniature coil of the present invention is applied to the drive coil of an axial flux type motor.
Figure 12:
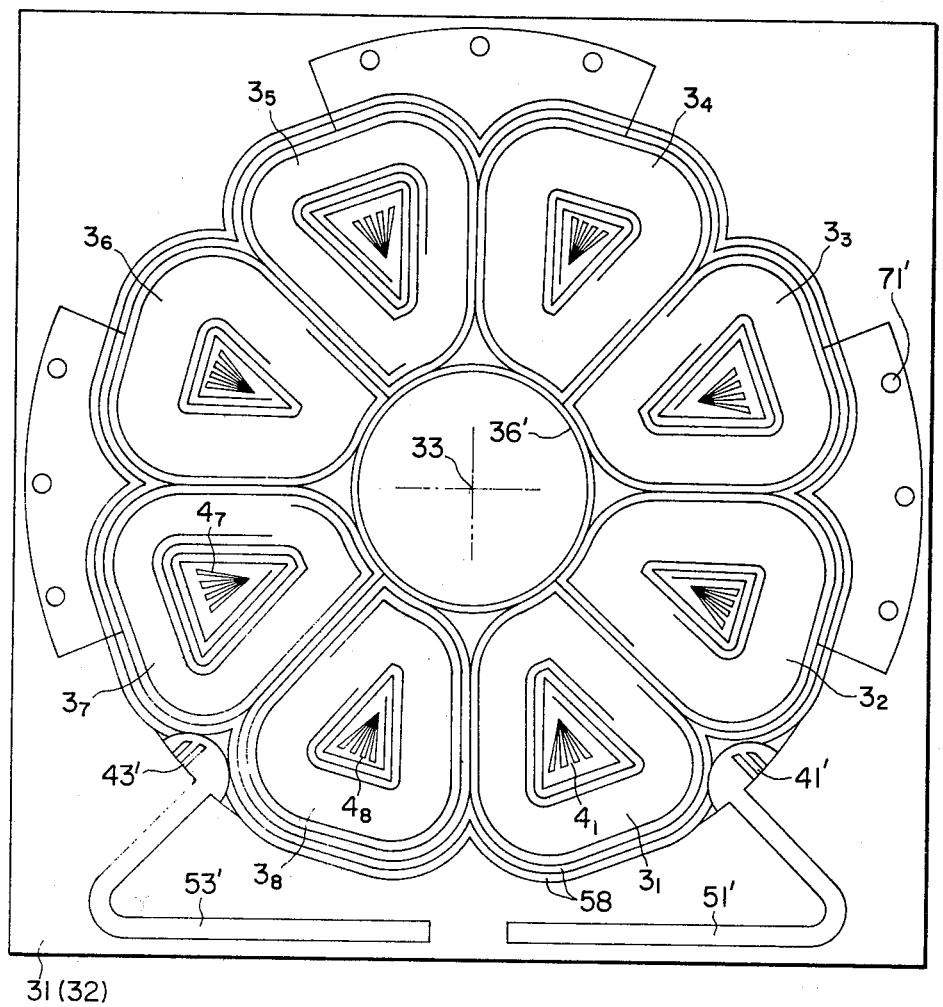
FIG. 12 shows the bottom view of FIG. 11.
Figure 15:
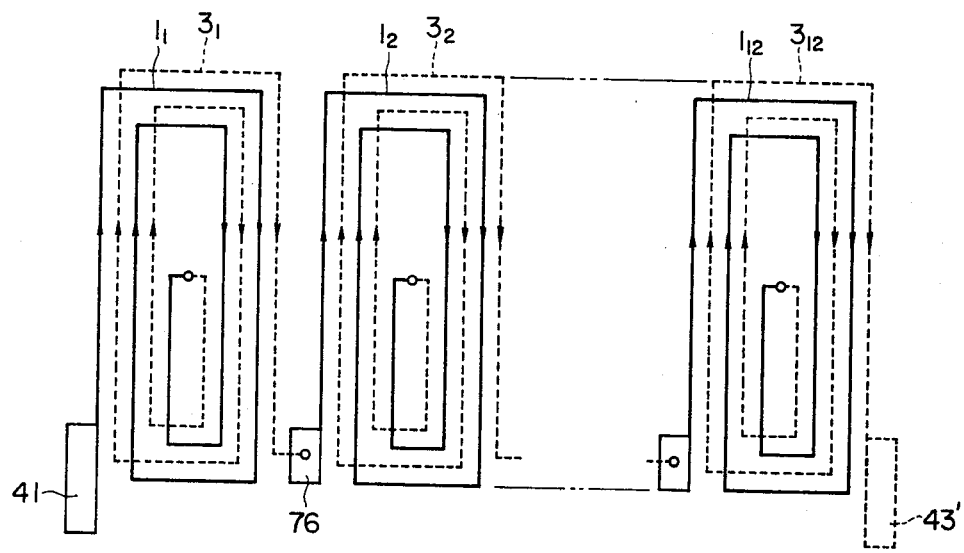
FIG. 15 is a drawing explaining the current flow in the coil of FIG. 14.

From the viewpoint of providing a plural number of coil sheets, it is allowed to make the coil pattern and lead wire pattern as shown in FIG. 11 and FIG. 12. In FIG. 11 and FIG. 12, the parts which correspond to the parts in FIG. 5 and FIG. 6 have the same numerals. In this example, the terminals are arranged at intervals which are integral times of two times of the coil pitch. In this example, the empty spaces between two adjacent coils are utilized; for example, the terminal 41 is provided in the empty parts on the outsides of coils $1_1$ and $1_2$, the lead wire 51 is connected to it, and the terminal 43 is installed in the empty space on the outside between the coils $1_7$ and $1_8$, and the lead wire 53 is connected to it. Of course the terminal 41 is connected to the outer end 46 of the coil $1_1$ and the terminal 43 is connected to the outer and 49 of the coil $1_8$. Further, in order to connect the terminals 41, 43 to terminals 41', 43' and connect the connecting sections $2_1$ through $2_8$ to the connecting sections $4_1$ through $4_8$ on the back side, the opposite patterns are also designed to fill each other but are slightly different from those shown in FIG. 5 and FIG. 6. However, the fact that these patterns are in the negative-positive relationship still holds. As was described in reference to to FIG. 8, each connecting section and terminal is mutually connected through the insulating sheet. Furthermore, a portion of each coil is made angular so as to fit with the angular portion of the adjacent coil such that the pair of coils provides a part of continuous circumference opposite to the circular groove 36 as seen in FIGS. 11 and 12. These angular portions on the front side and back side are shifted from each other by one pitch of the array of coils. The reason for this will be described later. Patterns 71 and 71' are formed as position aligning patterns. Their shapes are slightly different from the cases of FIG. 5 and FIG. 6.

Figure 13:
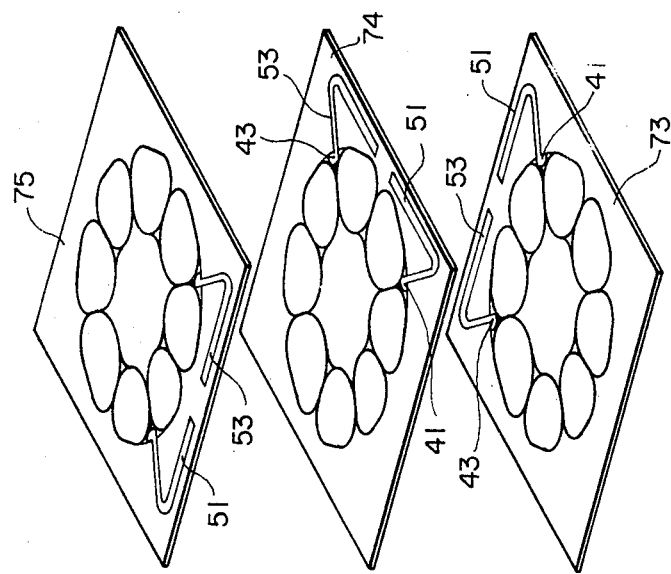
FIG. 13 is a drawing explaining the piling of the coil sheets shown in FIG. 11.

When using several coil sheets of the type shown in FIG. 11 and FIG. 12 in a pile, for example, three coil sheets 73, 74, and 75 are angularly displaced one another by an angle equal to the angular interval between the terminals 41 and 43 as shown in FIG. 13. For example, the coil sheet 74 is placed on the coil sheet 73 such that the terminal 43 of the former is opposite to the terminal 41 of the latter and, then their lead wires 53 and 51 are connected to each other. In the same manner, the coil sheet 75 is placed on the coil sheet 74 such that the terminal 43 of the coil sheet 74 is opposite to the terminal 41 of the coil sheet 74, and then their lead wires 53 and 51 are connected to each other. When a current is supplied to the lead wire 53 of the coil sheet 73 and taken out from the lead wire 51 of the coil sheet 75, the current flows through all the coils of the coil sheets 73 through 75 in series and the magnetic fluxes generated by the coils piled one upon another are mutually added. In the case where the coil sheets are used in a pile, piling is made after applying insulating coating or by way of an insulating sheet as mentioned before, and bonded with materials such as heat resistive epoxy resins, polyurethane resins, or phenol resins. After bonding, the unnecessary portion outside the coil is removed when required. lead wires can also be removed except for their starting and ending portions.

Next, an example of a drive coil for the radial flux type motor described in reference to FIG. 3 and FIG. 4 will be described referring to FIG. 14. In this case, the coils $1_1$ through $1_{12}$ are disposed in line, each coil being a rectangular spiral coil, and lead wires 41 and 43 are led out from both ends of the coil sheet. Further, on the back side of the insulating sheet, coils $3_1$ through $3_{12}$, not shown in the drawing, are provided opposite to the coils $1_1$ through $1_{12}$, and, when seen from the same direction, these opposing coils are wound in reverse directions and accordingly, when seen from the back side, these coils have the same winding direction as the coils on the front side and accordingly are manufactured by using the same pattern. The opposing pairs of coils on the front and back sides are connected in such a way that the connecting sections $2_1$ through $2_{12}$ at their inner ends are connected to the connecting sections $4_1$ through $4_{12}$, not shown in the drawing, through the insulating sheet in a way similar to the case described referring to FIG. 5 and FIG. 6. Further, a connecting section 76 is provided between adjacent coils and the outer end of each coil on the front side and the outer end of the coil on the back side fo the adjacent coil are connected to each other through the connecting section 76.

To facilitate easy understanding, the coil sheet shown in FIG. 14 is represented in a simplified form in FIG. 13, wherein, for example, the coils $1_1$ through $1_{12}$ on the front side are shown by solid lines, the coils $3_1$ through $3_{12}$ on the back side are shown by dotted lines. The current supplied to the terminal 41 flows from the outside of the coil $1_{12}$ to the inner end, then, flows from the inner end toward the outer side of the coil $3_1$, and appears to the front side through the connecting section 76 to flow into the coil $1_2$ toward its inner end, then flows into the inner end of the coil $3_2$ on the back side, etc. In this way the current flows from the outside to the inside of the front side coils or the coils shown by solid lines, and the current flows from the inside to the outside in the case of back side coils shown with dotted lines. As a result, the currents flow in the same direction through the coils $1_1$ and $3_1$ as shown by arrows to add the magnetic fluxes generated by these coils to each other. The current flows through all coils in series from the terminal 41 and flows out of the terminal 44 connected to the outer end of the coil $3_{12}$ on the back side.

Figure 16:
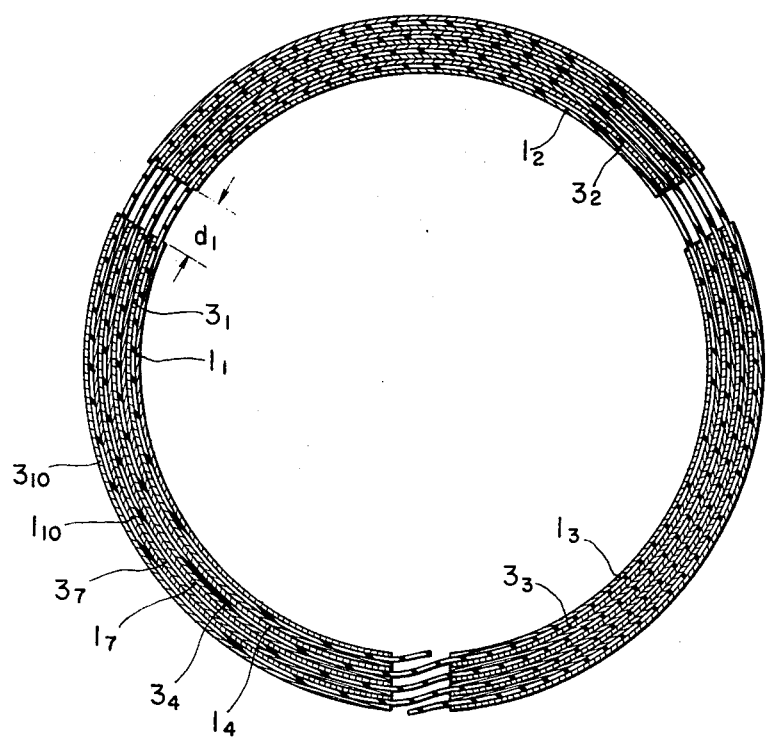
FIG. 16 is a front view showing the state in which the coil sheets shown in FIG. 14 are wound into multi-layers.

The coil sheet of the type shown in FIG. 14 may be wound in one fold to form the drive coil, but to increase the density of the magnetic flux generated in the coil, it is wound in several folds. In this example, twelve coils are formed respectively on both the front side and on the back side and the coil sheet is wound fourfold in the direction of the coil array, in other words, the coil sheet is used as the drive coil for a 6-pole motor. In this way the coil sheet is wound fourfold and four layers of coils are disposed at the same angular position to be opposite to each other. As shown in FIG. 16, one fold of the 1st layer from the inside constitutes the coils $1_1$ through $1_3$ and $3_1$ through $3_3$ and the one fold of the 2nd layer constitutes the coils $1_4$ through $1_6$ and coils $3_4$ through $3_6$, and so on, and these four sets of coils are piled to form three units of coils. In this case the more outside winding of the coil sheet has a larger winding diameter than the inner winding. The portion of the spacing between the adjacent coils designated by $d_1$ in FIG. 14 becomes larger in the more outside winding, and the size of each coil can be made equal to facilitate manufacturing. In this way, when the coil sheet is wound into a multilayer winding when used, in order to provide the coil sheet with a uniform stiffness to facilitate easy folding, it is desirable to form over the coil sheet the dummy wires 58 in the space between adjacent coils at the same interval as the pitch of the conductor of the coil.

Figure 20:
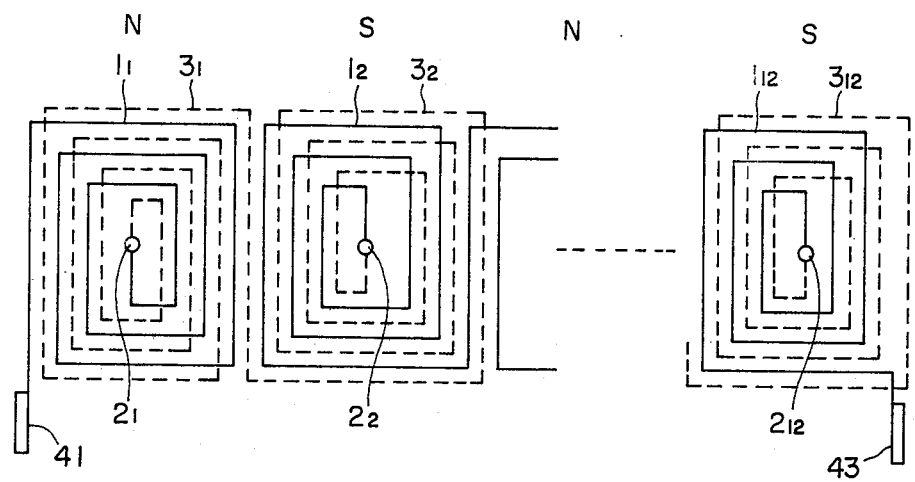
FIG. 20 shows the coil connection in another example wherein the present invention is applied to the drive coil of a radial flux type motor.

In the radial flux type motor, when this invention is applied to the drive coil whose coil pitch is made to coincide with the magnetic pole pitch, the pattern shown, for example, in FIG. 20 is successfully used. That is, on the surface of the insulating sheet (not shown in the drawing), rectangular spiral coils $1_1$ through $1_{12}$ are disposed in line as shown with solid lines. Opposite to these coils $1_1$ through $1_{12}$, the similar coils $3_1$ through $3_{12}$ are formed on the back surface of the insulating sheet as shown with dotted lines. Among the coils $1_1$ through $1_{12}$ and the coils $3_1$ through $3_{12}$, those which are opposite to each other are connected to each other at inner end connecting sections $2_1$ through $2_{12}$ of individual coils and the connection between the outer ends of adjacent coils is made alternatively on the front side and back side of the insulating sheet in the coil arrangement direction. For example, the outer ends of the coils $1_1$ and $1_2$ are not connected to each other but the connection between the outer ends of the coils $3_1$ and $3_2$ is made. While the outer ends of the coils $1_3$ and $1_4$ are connected, and the outer ends of the coils $3_3$ and $3_4$ are not connected. In the same way, the outer ends of the coils $1_5$ and $1_6$ are not connected and the outer ends of the coils $3_5$ and $3_6$ are connected, and so on. To both ends of the series connection of the coils are connected the terminals 41 and 43 respectively. The coils $1_1$ through $1_{12}$ are wound in the same direction and the winding direction of coils $3_1$ through $3_{12}$ is, when seen from the same side as the coils $1_1$ through $1_{12}$, the same as that of the coils $1_1$ through $1_{12}$. In FIG. 20 the drive coil is shown in the unfolded state. The relationship between the coils and the magnetic poles of the rotor at a certain instant is such that the magnetic poles N.S. N.S. . . . are opposite to the coils $1_1$, $1_2$, $1_3$, $1_4$ . . . , respectively.

Figure 21:
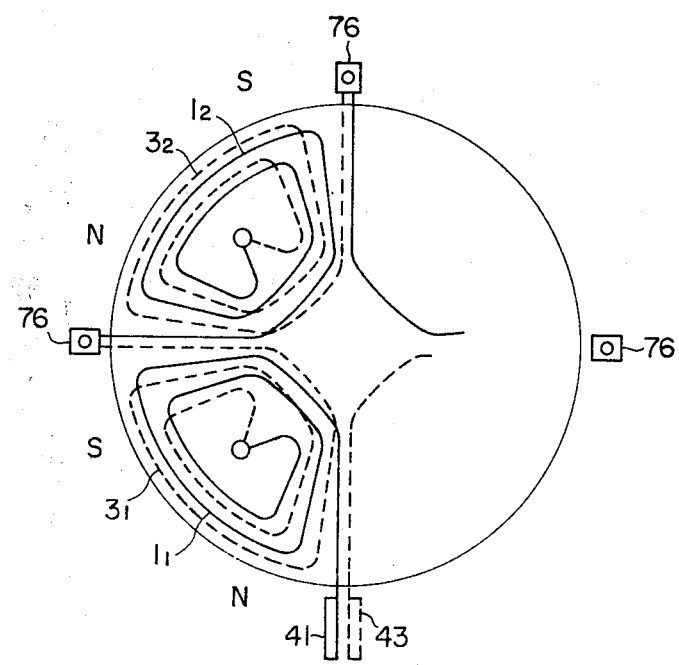
FIG. 21 shows the connection of coils in another case where this invention is applied to the drive coil of an axial flux type motor.

This invention can also be applied to the drive coil of a axial flux type motor in which the coil pitch of the drive coil is made two times the pitch of the magnetic poles. For example, as shown by solid lines in FIG. 21, the coils $1_1$ through $1_4$ of the same winding direction are formed on the surface of the insulating sheet (not shown) at equal angular intervals on one circumference, and the coils $3_1$ through $3_4$ are formed on the back side of the insulating sheet opposite to the coils $1_1$ to $1_4$ as shown by the dotted lines. When seen from the same side, the winding direction of coils $3_1$ through $3_4$ is the same as that of the coils $1_1$ through $1_4$. Among the coils $1_1$ through $1_4$ and coils $3_1$ through $3_4$, the inner terminals of the ones which are opposite to each other are connected to each other at the connecting sections $2_1$ through $2_4$, and the outer ends of the adjacent coils on the front side and the back side are connected at the connecting section 76. That is, the outer ends of the coils $3_1$ and $1_2$, $3_2$ and $1_3$, and $3_3$ and $1_4$ are respectively connected. At a certain rotational position of the rotor, these coils $1_1$ through $1_4$ and $3_1$ through $3_4$ have positional relationships with the rotor magnetic poles N and S of the motor as shown in FIG. 21 and the magnetic pole pitch is one half of the coil pitch.

Since the insulating sheet 31 of the coil sheet is very thin, if there are portions on both sides of the insulating sheet there are portions, there are portions, where no conductor is formed, that portion is easy to break and becomes hard to handle. In order to avoid this problem, for example, as shown in FIG. 17 and FIG. 18, the coil $3_1$ on the back side is shifted by half the interval of the coil conductor 35 or the pitch with respect to the coil $1_1$ on the front side, and the conductor 35' of the coil $3_1$ on the back side is positioned opposite the groove 34 between the coil conductors 35. Then the portion consisting only of the insulating sheet disappears and the sheet as a whole becomes mechanically strong and easy to handle. The mutual shifting of the coils on the front side and coils on the back side can be made not only in a parallel direction but also, for example, in a slightly oblique direction as shown in FIG. 19; in other words, the parallelness between the coils on the front side and the coils on the back side is slightly shifted so that straight portion of one coil conductor of a coil is made to intersect with the two adjacent conductors of the opposite coil. In this way, if, for example, the coil conductor on the front side and the coil conductor on the back side are made to overlap each other by at least two adjacent conductors, the coil sheet will increase its mechanical strength. The example where the technique to increase the intersectional portion between the coil conductors on the front side and back side has been applied to the coil of an axial flux type motor is shown in FIG. 11 and FIG. 12. By making angular a part of each coil on the inner side of the coil array and arranging the angular parts on the front side and back side alternately, mechanical strength is enhanced by the same reason mentioned before.

As has been described, by use of the miniature motor coil of the present invention the conductor occupation rate can be increased remarkably, the manufacture becomes easy, and the assembly can be attained in an axial flux type motor by only piling up coil sheets depending on the need, and with respect to the radial flux type motor only the winding of the coil sheet is needed. This eliminates the work to align the relative positions of coils accurately and assembly is made very easy. Moreover, the coil of the present invention can be applied not only to the drive coils but also to the so-called FG coil used for detecting the rotational angle position of the rotor, or to other cases.

What is claimed is:

1. A printed circuit miniature motor coil comprising:
an insulating sheet;
a plurality of printed circuit spiral type first coils of substantially the same shape and size disposed on one surface of said insulating sheet;
a like plurality of printed circuit second coils having substantially the same shape and size as said first coils, said second coils being disposed on the other surface of said insulating sheet in opposing relation respectively to each of said first coils and, when viewed from the same direction, having their spiral direction reverse to that of said first coils, the inner end of each of said spiral first coils being connected to the inner end of the opposing one of said second coils via a connection section which passes through said insulating sheet, and the outer ends of said first and second coils also being connected to one another such that all the coils are in series connection; and first and second terminals respectively provided at the opposite ends of said series connection of coils for energizing said series connected coils so that each of said first coils produces magnetic flux which is in phase with the flux produced by the opposing one of said second coils;

the relative positions of the opposing first coils and second coils in each pair of opposing coils being shifted relative to one another to enhance the mechanical strength of the motor coil sheet, the shifted relationship being such that the conductor portion of at least one winding on one coil of each pair of opposing first and second coils overlies the space between the conductor portions of two adjacent windings of the other coil in said pair of coils and overlaps the said conductor portions of said two adjacent windings of the other coil, the overlapping part being more than half the length of a coil in the longitudinal direction of the conductor section of the one winding.

2. A printed circuit miniature motor coil comprising:
an insulating sheet;
a plurality of printed circuit spiral type first coils of substantially the same shape and size disposed in alignment with one another on one surface of said insulating sheet;
a plurality of printed circuit second coils having substantially the same shape and size as said first coils, said second coils being disposed in alignment with one another on the other surface of said insulating sheet in opposing relation respectively to each of said first coils and, when viewed from the same direction, having their spiral direction reverse to that of the first coils, the inner end of each of said first and second coils being provided with a conductive connecting section, the patterns of the inner end connecting sections of said first coils being complementary in shape, in a negative-positive relationship, to the inner end connecting sections of said second coils, the inner end connecting sections of said first coils being disposed in directly opposing relation to the inner end connecting sections of said second coils respectively and each opposing pair of connecting sections being in interfitting engagement with one another in said negative-positive relationship thereby to interconnect said first and second coils to one another at their inner ends respectively via said interfitting connecting sections, the outer ends of said first and second coils also being connected to one another such that all the coils are in series connection; and
first and second terminals respectively provided at the opposite ends of said series connection of coils for energizing said series connected coils so that each pair of opposing first and second coils produces magnetic fluxes which are in phase with one another.

3. A miniature motor coil according to claim 1 or claim 2, in which, almost surrounding the outer circumferences of each of said first and second coils, there is provided at least one string of dummy wire which is as fine as the coil conductor and is insulated therefrom.

4. A miniature motor coil according to claim 1 or claim 2 wherein said first and second terminals comprise a first pair of terminals disposed on said one surface of said sheet and connected respectively to the outer ends of spaced ones of said first coils, a second pair of terminals disposed on the other surface of said sheet in opposing relation respectively to said first pair of terminals and connected respectively to the outer ends of spaced ones of said second coils, and terminal connecting sections passing through said sheet for electrically connecting each of said first pair of terminals respectively to the opposing one of said second pair of terminals.

5. A miniature motor coil according to claim 1 or claim 2 in which the connection of said outer ends are made between every two adjacent first coils and between every two adjacent second coils alternately in their arrangement direction.

6. A miniature motor coil according to claim 1 or claim 2 wherein the outer end of each of said first and second coils is provided with a conductive connecting section, and means interconnecting the outer end connecting section of each of said first coils to the outer end connecting section of one of said second coils.

7. A miniature motor coil according to claim 1 or claim 2 in which said first and second coils are disposed on one circumference, respectively.

8. A miniature motor coil according to claim 7 in which a plurality of coil sheets, on each of which is formed said pluralities of first and second coils, are superposed on one another in a stack with their respective coils opposite to one another, the first and second terminals on each pair of adjacent coil sheets in said stack being electrically connected to one another respectively so that the coils of all said sheets in said stack are connected in series with one another and so that the magnetic fluxes generated by passing current through the series connected coils are in additive relation to one another at each set of opposing coils in said stack.

9. A miniature motor coil according to claim 8, in which a pair of said first and second terminals of said coil sheets are provided at an angular interval which is an even number times of each coil array pitch and only one terminal on said each coil sheet is made to be opposite to the one terminal on the adjacent coil sheet and connected to each other.

10. A miniature motor coil according to claim 1 or claim 2, in which said first and second coils are respectively arranged on a straight line.

11. A miniature motor coil according to claim 10, in which said insulating sheet is cylindrically folded into a plurality of layers in the direction of the array of coils, and said coils on each wound layer are opposite to each other.

12. A miniature motor coil according to claim 11 in which the pitch of the coil conductors of each coil is selected to be the same, and the interval between adjacent coils in each layer increases from one layer to the next adjacent outside wound layer.

13. A miniature motor coil according to claim 10, in which the interval between each adjacent coil is almost filled with dummy wires which have the same pitch as the pitch of the coil conductors and which are almost parallel to the coil conductors.

14. A miniature motor coil according to claim 13, in which said dummy wires intersect with each other on the front and rear sides of the insulating sheet.

15. A miniature motor coil according to claim 1 or claim 2 in which the insulating sheet comprises two sheets of insulating film which are bonded together by a bonding agent disposed between said sheets.

16. A miniature motor coil according to claim 8, wherein said stack comprises two coil sheets, a third terminal disposed between the said first and second terminals on each coil sheet, and a plurality of changeover connecting sections on said coil sheets for making selective connections between said first and second terminals and both ends of the series connected coils and between said third terminal and both ends of the series connected coils on each coil sheet, respectively, each of the changeover connecting sections having a cut therein for electrical disconnection.

17. A process for manufacturing a miniature motor coil, comprising the steps of forming conductor patterns on both sides of an insulating sheet by a chemical etching technique, the conductor patterns on each side of said sheet comprising a plurality of coils and a connecting section at at least one end of each of said coils, the connecting sections on the opposite sides of the sheet being configured respectively in complementary, negative-positive patterns relative to one another; pressing the complementary connecting sections together so that they fill each other in interfitting relation to one another thereby to achieve electrical interconnections between the negative and positive patterns of pairs of said connecting sections on opposite sides of said sheet, and applying a current through said interfitted negative and positive patterns sufficient to electrically weld the interfitted connecting sections together.

* * * * *